No. 88.—*Improved Right or Left Hand Lock.*

What we claim as our invention and desire to secure by additional letters patent, is the constructing the lock tumbler of two parts C, C, of such a form and combined with each other and with the arms *b*, *b*, of the lock bolt, in such a manner in relation to the key holes F, F, placed in reversed positions near each end of the lock, that a key will operate the tumbler and bolt equally well when inserted into either of the said key holes, substantially in the manner herein set forth.

L. R. LIVINGSTON.
J. J. ROGGEN.
CALVIN ADAMS.

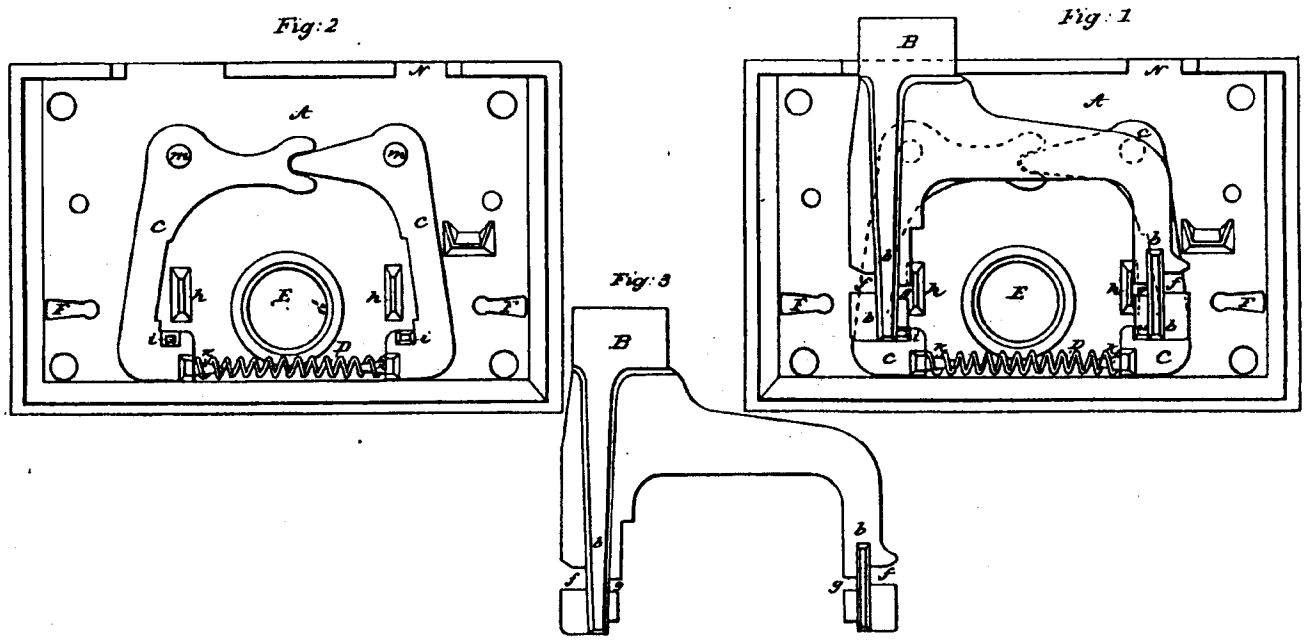

Livingston, Roggen & Adams.
Latch.
No. 88.
A.L. Patented June 5, 1849.

AM. PHOTO-LITHO. CO. N.Y. (SUCCESSOR TO SARGENT'S PROCESS)

DEPARTMENT OF COMMERCE
UNITED STATES PATENT AND TRADEMARK OFFICE

---

MISSING PAGE(S)

PATENT NUMBER AI 88 FOR THE ISSUE DATE 06/05/1849 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text